Nov. 2, 1948.  L. R. SHANTON  2,452,605
LUBRICATED CRANK STRUCTURE
Filed Feb. 6, 1947  2 Sheets-Sheet 1

Inventor
Leon R. Shanton
By Clarence A. O'Brien
and Harvey B. Jacobson
Attorneys Nov. 2, 1948.  L. R. SHANTON  2,452,605
LUBRICATED CRANK STRUCTURE
Filed Feb. 6, 1947  2 Sheets-Sheet 2
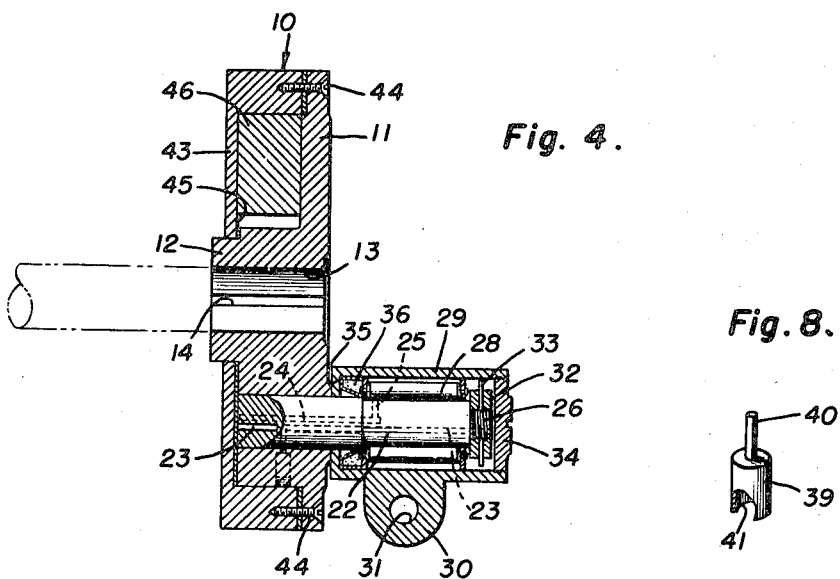
Fig. 4.
Fig. 8.
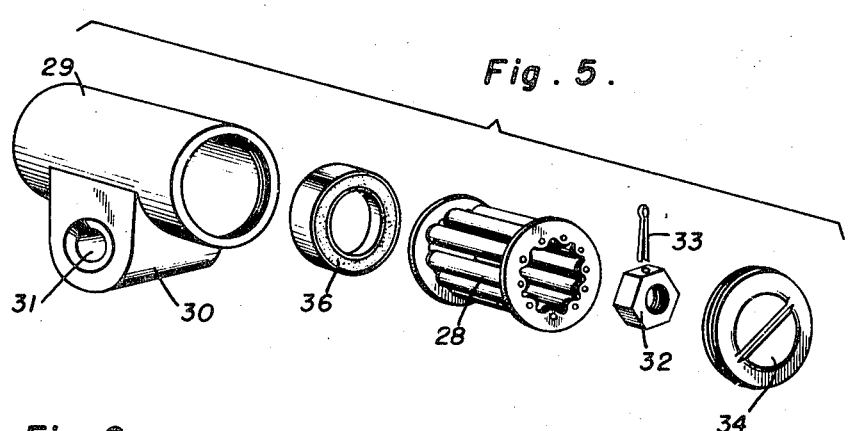
Fig. 5.
Fig. 6.
Fig. 7.
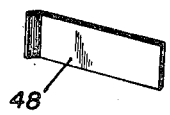
Inventor
Leon R. Shanton
By Clarence A. O'Brien
and Harvey B. Jacobson
Attorneys Patented Nov. 2, 1948

2,452,605

UNITED STATES PATENT OFFICE 2,452,605

LUBRICATED CRANK STRUCTURE

Leon R. Shanton, Cherryvale, Kans.

Application February 6, 1947, Serial No. 726,911

3 Claims. (Cl. 74—605)

This invention relates to a lubricated structure and more particularly to a self lubricated crank structure of the type disclosed in United States Patent 1,890,550, issued December 31, 1932, to G. Stenglemeir.

The primary object of the invention is to insure complete and satisfactory lubrication of the moving parts employed in coupling a connecting rod or pitman to a drive shaft.

Another object is to maintain constant lubrication of the connected parts and to employ the pumping effect of a rotating reservoir to force the lubricant to the crank and bearing.

The above and other objects may be attained by employing this invention which embodies among its features a rotary reservoir forming the crank disc of a crank structure, a crank pin extending from one face of the crank disc and having a longitudinally extending oil feed or distributing passage, an oil return passage both in communication with the reservoir, an anti-friction bearing on the crank pin to which the lubricant is supplied from the reservoir through the ducts or passages, an oil tight housing enclosing the anti-friction bearing and means on the housing for connection to a connecting rod or pitman.

Other features include valves for regulating the flow of lubricant through the ducts and arresting the flow of fluid therethrough when the device is at rest, and means within the reservoir for forcing the lubricant into the feed duct as the unit is rotated.

In the drawings:

Figure 4 is a vertical sectional view through the unit;

Figure 5 is an exploded view of the anti-friction bearing, the housing therefor and the parts employed in connection therewith;

Figure 6 is a perspective view of the crank pin;

Figure 7 is a perspective view of the oil gate, and

Figure 8 is a perspective view of one of the valves, certain portions being broken away more clearly to illustrate certain details of construction.

Figure 1:
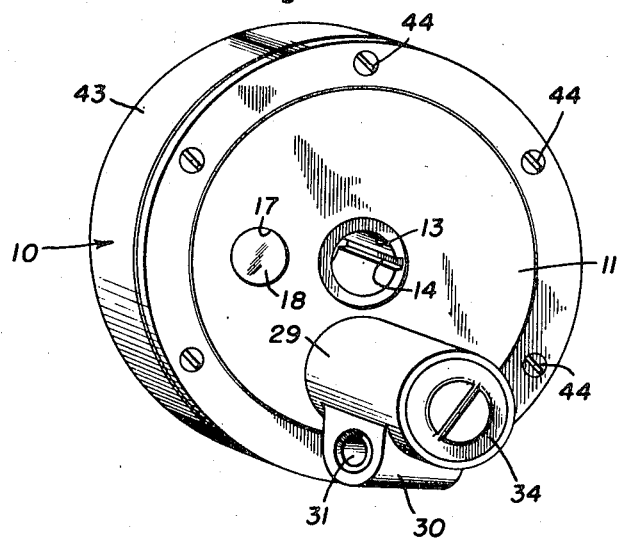
Figure 1 is a perspective view of a complete self lubricated crank structure embodying the features of this invention.
Figure 2:
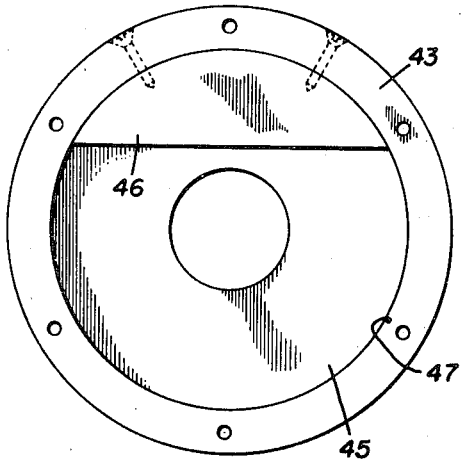
Figure 2 is a face view of the cover for the crank disc.

Referring to the drawings in detail, my improved self lubricated crank structure designated generally 10 comprises a crank disc 11 having formed integrally therewith and extending outwardly from one face thereof a concentric hub 12 provided with an axial bore 13 for the reception of the drive shaft to which the device is coupled. A keyway 14 is formed in the hub and opens into the bore 13 for the reception of a suitable key by means of which positive rotation of the disc 11 and shaft is assured. Extending radially from the hub 13 and toward the periphery of the disc 11 is an arm 15 which is provided with a bore 16 which extends parallel to the bore 13 entirely through the arm 15 and the crank disc 11. Also formed in the crank disc 11 in spaced relation to the arm 15 is an opening 17 which is sealed with a sight glass 18 of any suitable transparent material to permit an observer to determine the level of the lubricant contained within the device. Formed in one wall of the arm 15 is a groove 19 into which one end of the oil gate to be more fully hereinafter described is seated. Extending through one side wall of the arm 15 and communicating with the bore 16 is a bore 20 forming an oil duct, and an inclined bore 21 extends from a point near the outer end of the arm through the side wall and inwardly into the opening 16 to form an oil discharge duct as will be more fully hereinafter explained. The duct 20 at its outer end terminates near the groove 19 but inwardly thereof and forms an oil inlet duct through which oil is introduced into the crank pin or distributing duct to be more fully hereinafter described.

Fixed in the opening 16 is a crank pin 22 which is formed with a longitudinally extending oil distributing or feed duct 23 which extends throughout the entire length of the pin as will be readily understood upon reference to Figure 6. The pin is also provided with an oil return duct 24 which opens through the end which is fixed in the opening 22 and terminates intermediate the ends of the pin. A radial passage 25 extends through the side of the pin and communicates with the inner end of the duct 24 as will be understood upon reference to Figures 4 and 6. The end of the pin opposite that which is fixed in the opening 16 is provided with an externally screw threaded boss 26 having a cotter pin opening 27 extending transversely therethrough.

Figure 3:
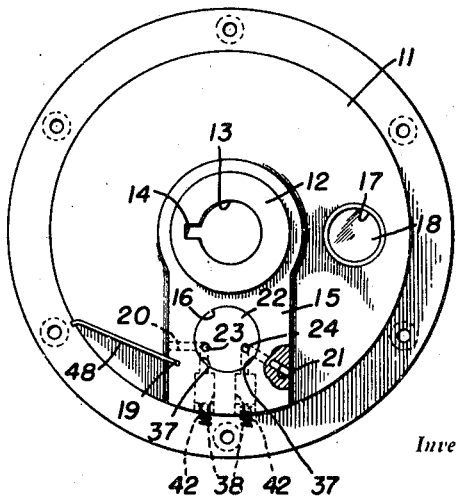
Figure 3 is a face view of the crank disc.

Mounted for rotation on the portion of the pin 22 which projects from the face of the disc 11 is an anti-friction bearing 28 upon which is rotatably supported an oil tight housing 29 carrying an ear 30 which extends radially therefrom and is provided with an opening 31 to which a connecting rod or pitman is coupled. A retaining nut 32 is threaded on the threaded end 26 of the pin 22 and locked in place by a cotter key 33 which is adapted to be projected through the nut and through the opening 27 in the threaded extension. Threaded into the outer end of the housing 29 is a sealing plug 34 which serves to prevent the escape of lubricant through the outer open end of the housing. The opposite end of the housing is provided with an inturned flange 35 and an oil seal 36 is interposed between the inner end of the anti-friction bearing 28 and the flange 35 to prevent the escape of the lubricant from the housing. As shown the radial opening 25 is disposed near the inner end of the anti-friction bearing so that as lubricant is circulated through the feed duct 23 it will flow outwardly through the end of the crank pin 22 and thence back through the elements of the anti-friction bearing 28 to return through the ducts 25 and 24 to the reservoir to be more fully hereinafter described. Near the ends of the ducts 23 and 24 opposite the extension 26 of the crank pin 22 are outwardly extending ducts which communicate with the ducts 20 and 21 respectively, and extending through the pin 22 and communicating with the ducts 23 and 24 near the ducts 20 and 21 are passages 37 which extend outwardly and open into relatively larger bores 38 formed in the arm 15. A plunger valve 39 is seated in each bore 38 and carries an inwardly extending valve member 40 which when the valve is pressed inwardly closes its respective passage 23 or 24 as will be readily understood upon reference to Figure 3. Each valve 39 is provided in the end opposite the valve member 40 with an axial bore 41 in which a compression coil spring 42 is seated. It will thus be seen that when the parts are assembled the springs 42 will tend to hold the valve members in duct closing position.

A hollow cover member 43 having a peripheral flange which is adapted to be attached as by attaching screws 44 to the disc 11 encloses the arm 15 and cooperates with the disc 11 in forming a lubricant reservoir 45. A suitable counterweight 46 is secured in this reservoir at a point diametrically opposite the arm 15 and formed in the inner wall of the peripheral flange of the cover 43 is a groove 47 for the reception of one end of the oil gate 48, the opposite end of which seats in the groove 19 in the arm 15 as will be understood upon reference to Figure 3.

In use it will be understood that the reservoir 45 is filled with the lubricant to be employed and the level of the lubricant within the reservoir may be ascertained by examination of the transparent window 18. With the hub 12 coupled to a drive shaft in a conventional manner it will be obvious that as the drive shaft rotates the crank pin 22 will move in an orbital path concentric with the axis of the drive shaft and upon coupling the ear 30 to a suitable connecting rod the rotary motion of the drive shaft may be converted into reciprocable motion. As the disc 11 and cover 43 rotate it will be obvious that the lubricant contained within the reservoir 45 will by reason of the gate 48 enter the passage 20 to flow through the duct 23 in the crank pin 22 and thence outwardly through the outer end thereof and into the housing 29 from whence it flows over the anti-friction bearing and back through the passage 25, duct 24 and duct 21 into the reservoir. In this way the moving parts of the device constantly are lubricated while it is in motion. When the device comes to rest the valves 39 will close their respective passages to prevent the entrance of the lubricant thereinto, it being understood that the centrifugal action of the rapidly rotating disc causes the valves to unseat and open their respective passages when the unit is in motion. Obviously, the counterweight 46 will counterbalance the weight of the arm 15 and the crank pin and housing 29 with the mechanism enclosed therein so as to insure smooth operation of the device.

While in the foregoing there has been shown and described the preferred embodiment of this invention it is to be understood that minor changes in the details of construction, combination and arrangement of parts may be resorted to without departing from the spirit and scope of the invention as claimed.

What I claim is:

1. A self lubricated crank structure comprising a crank disc, a hub on the crank disc having a shaft receiving bore concentric with the crank disc, a radial arm integral with the crank disc lying between the periphery thereof and the hub, said arm having an opening therein lying parallel with the shaft receiving bore in the hub, a crank pin fixed in the opening and extending outwardly therefrom opposite the hub, said crank pin having a longitudinal oil inlet duct extending therethrough, said pin having a longitudinal oil return duct extending from the end which is fixed in the opening to a point intermediate its ends and a radial duct opening through its side into the return oil duct, an anti-friction bearing on the crank pin, an oil tight housing enclosing the anti-friction bearing, a coupling on the housing for connection to a connecting rod and a hollow cover enclosing the arm for cooperation with the crank disc in forming a reservoir for lubricant, the pin and the arm having a duct therein which establishes communication with the inlet duct and the reservoir and the pin and the arm having a duct therein which establishes communication between the return duct and the reservoir.

2. A self lubricated crank structure comprising a crank disc, a hub on the crank disc having a shaft receiving bore concentric with the crank disc, a radial arm integral with the crank disc lying between the periphery thereof and the hub, said arm having an opening therein lying parallel with the shaft receiving bore in the hub, a crank pin fixed in the opening and extending outwardly therefrom opposite the hub, said crank pin having a longitudinal oil inlet duct extending therethrough, said pin having a longitudinal oil return duct extending from the end which is fixed in the opening to a point intermediate its ends and a radial duct opening through its side into the return oil duct, an anti-friction bearing on the crank pin, an oil tight housing enclosing the anti-friction bearing, a coupling on the housing for connection to a connecting rod, a hollow cover enclosing the arm for cooperation with the crank disc in forming a reservoir for lubricant, the pin and the arm having a duct therein which establishes communication with the inlet duct and the reservoir and the pin and the arm having a duct therein which establishes communication between the return duct and the reservoir, and valves in the arm for closing the inlet and return ducts when the crank structure is at rest.

3. A self lubricated crank structure comprising a crank disc, a hub on the crank disc having a shaft receiving bore concentric with the crank disc, a radial arm integral with the crank disc lying between the periphery thereof and the hub, said arm having an opening therein lying parallel with the shaft receiving bore in the hub, a crank pin fixed in the opening and extending outwardly therefrom opposite the hub, said crank pin having a longitudinal oil inlet duct extending therethrough, said pin having a longitudinal oil return duct extending from the end which is fixed in the opening to a point intermediate its ends and a radial duct opening through its side into the return oil duct, an anti-friction bearing on the crank pin, an oil tight housing enclosing the anti-friction bearing, a coupling on the housing for connection to a connecting rod, a hollow cover enclosing the arm for cooperation with the crank disc in forming a reservoir for lubricant, the pin and the arm having a duct therein which establishes communication with the inlet duct and the reservoir and the pin and the arm having a duct therein which establishes communication between the return duct and the reservoir, and an oil gate extending diagonally between the peripheral wall of the reservoir and the arm.

LEON R. SHANTON.

REFERENCES CITED

The following references are of record in the file of this patent:

UNITED STATES PATENTS

| Number | Name | Date |
| --- | --- | --- |
| 1,804,236 | Sorenson | May 5, 1931 |
| 1,890,550 | Stenglemeir | Dec. 13, 1932 |
| 2,157,242 | Meagher | May 9, 1939 |